(12) United States Patent
Erlendsson

(10) Patent No.: US 11,525,212 B2
(45) Date of Patent: Dec. 13, 2022

(54) HIGH RESOLUTION HEADLINE SONAR CABLE

(71) Applicant: HAMPIDJAN HF, Reykjavik (IS)

(72) Inventor: Hjortur Erlendsson, Kopavogur (IS)

(73) Assignee: Hampidjan hf, Reykjavik (IS)

( * ) Notice: Subject to any disclaimer, the term of this patent is extended or adjusted under 35 U.S.C. 154(b) by 1051 days.

(21) Appl. No.: 16/082,209

(22) PCT Filed: Mar. 6, 2017

(86) PCT No.: PCT/IS2017/050004
§ 371 (c)(1),
(2) Date: Sep. 4, 2018

(87) PCT Pub. No.: WO2017/149553
PCT Pub. Date: Sep. 8, 2017

(65) Prior Publication Data
US 2020/0294695 A1    Sep. 17, 2020

Related U.S. Application Data

(60) Provisional application No. 62/304,142, filed on Mar. 4, 2016.

(51) Int. Cl.
*D07B 1/14* (2006.01)
*D04C 1/12* (2006.01)
(Continued)

(52) U.S. Cl.
CPC ............... *D07B 1/147* (2013.01); *A01K 73/02* (2013.01); *D04C 1/12* (2013.01); *D07B 5/12* (2013.01);
(Continued)

(58) Field of Classification Search
CPC ...... H01B 13/2606; D04C 1/12; D07B 1/147; D07B 5/12
See application file for complete search history.

(56) References Cited

U.S. PATENT DOCUMENTS 8,731,353 B2 * 5/2014 Erlendsson ............ A01K 75/00
385/101
8,953,915 B2 * 2/2015 Sarchi ..................... G01K 11/32
385/101

(Continued)

*Primary Examiner* — Shaun R Hurley
(74) *Attorney, Agent, or Firm* — Donald E. Schreiber

(57) ABSTRACT

A production method for a headline sonar cable characterized by steps of:
 a. providing a first strength member (14);
 b. coupling to strength member (14) a conductor (122);
 c. forming a layer of polymeric material about the combination of strength member (14) and conductor (122) while ensuring that the conductor remains slack;
 d. forming a flow shield around the layer of polymeric material, thus forming an elongatable internally located conductive structure; and
 e. braiding a strength-member jacket layer (52) of polymeric material around the elongatable internally located conductive structure while ensuring that the conductor is slack when surrounded by the jacket layer (52).

For another embodiment, an optical fibre is wrapped around the exterior of the layer of polymeric material within which is enclosed a braided conductor formed about the first strength member (14). Other embodiments employ further thermo-plastic layers and further sheaths and further conductors.

25 Claims, 8 Drawing Sheets

(51) Int. Cl.
*D07B 5/12* (2006.01)
*A01K 73/02* (2006.01)
*H01B 13/00* (2006.01)
*H01B 13/26* (2006.01)
*D07B 1/02* (2006.01)

(52) U.S. Cl.
CPC ..... H01B 13/0036 (2013.01); H01B 13/2606 (2013.01); *D07B 1/025* (2013.01); *D07B 2201/1096* (2013.01); *D07B 2201/209* (2013.01); *D07B 2201/2052* (2013.01); *D07B 2201/2055* (2013.01); *D07B 2201/2058* (2013.01); *D07B 2201/2074* (2013.01); *D07B 2201/2088* (2013.01); *D07B 2205/2003* (2013.01); *D07B 2205/205* (2013.01); *D07B 2205/2014* (2013.01); *D07B 2205/2039* (2013.01); *D07B 2205/2096* (2013.01); *D07B 2205/3007* (2013.01); *D07B 2501/2038* (2013.01); *D10B 2401/041* (2013.01); *D10B 2401/063* (2013.01)

(56) References Cited

U.S. PATENT DOCUMENTS

| | | | | |
|---|---|---|---|---|
| 9,110,189 | B2 * | 8/2015 | Erlendsson | H01B 7/145 |
| 9,704,617 | B2 * | 7/2017 | Erlendsson | H01B 7/045 |
| 2011/0110633 | A1 * | 5/2011 | Erlendsson | G01V 1/201 |
| | | | | 385/101 |
| 2014/0216782 | A1 * | 8/2014 | Erlendsson | H01B 7/145 |
| | | | | 174/110 R |
| 2015/0325335 | A1 * | 11/2015 | Erlendsson | H01B 7/045 |
| | | | | 174/70 R |
| 2017/0058454 | A1 * | 3/2017 | Safwat | D07B 5/005 |
| 2018/0240571 | A1 * | 8/2018 | Ning | H01B 7/0045 |
| 2018/0328071 | A1 * | 11/2018 | Wang | D04C 1/12 |

* cited by examiner

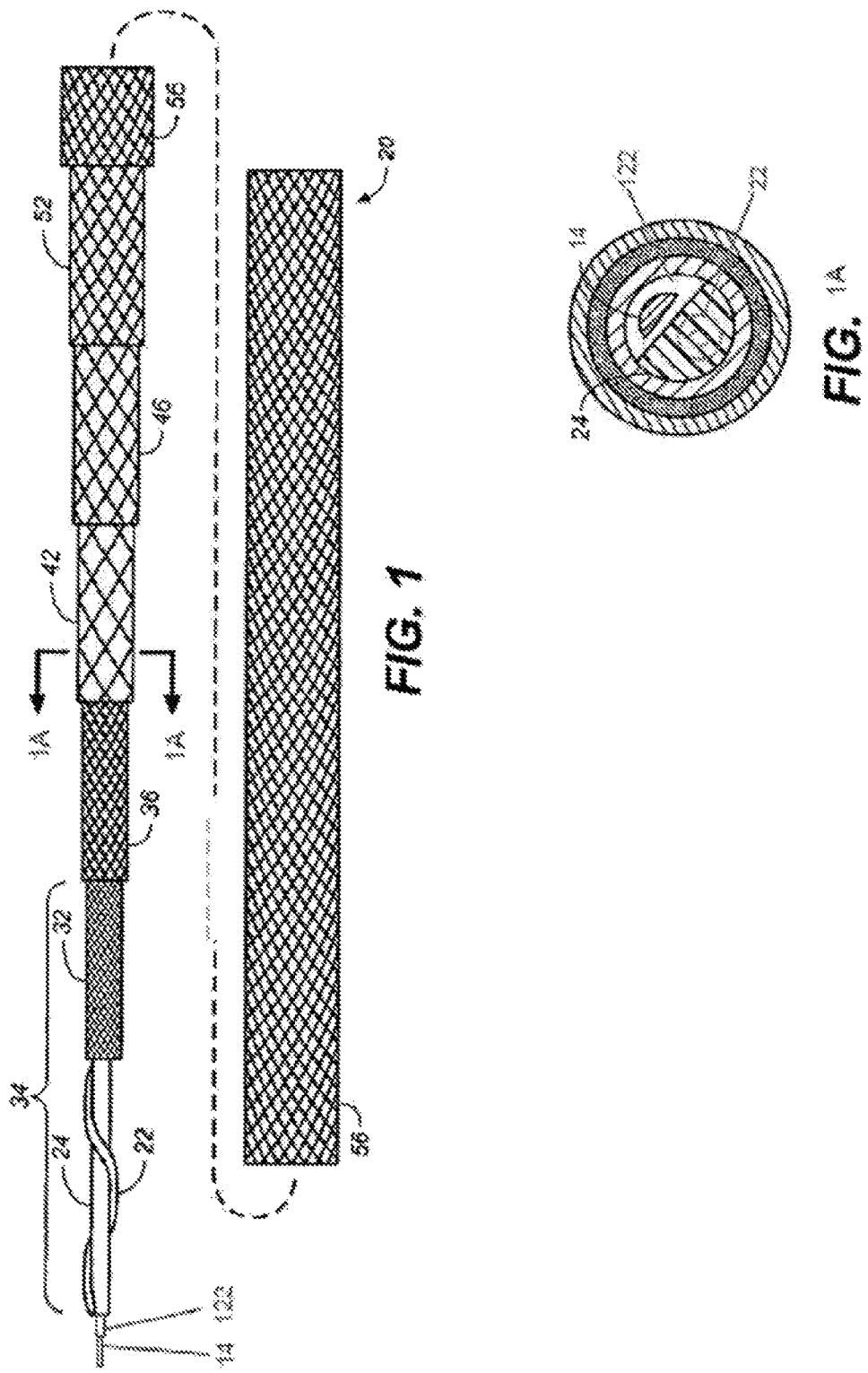

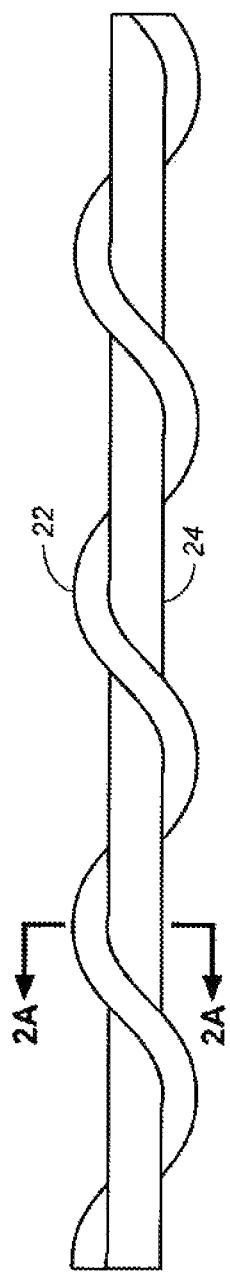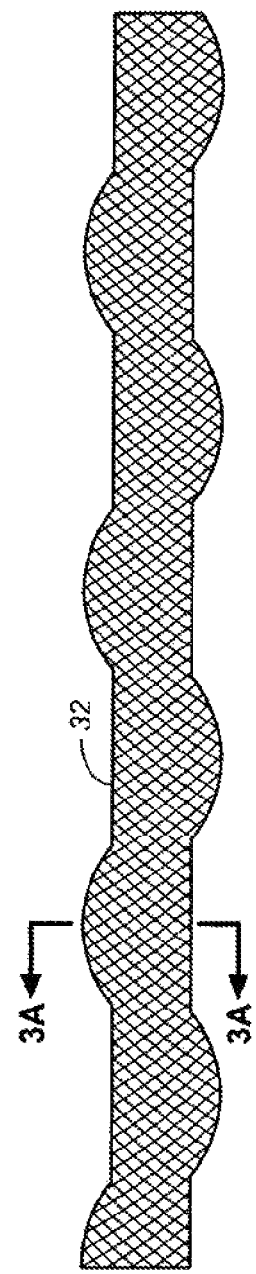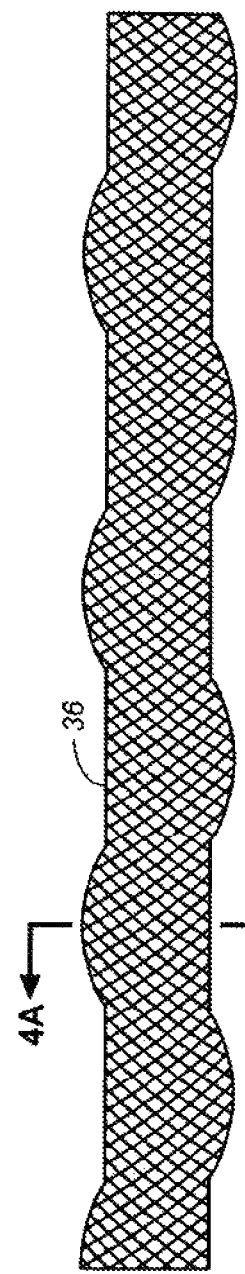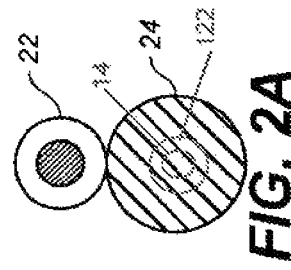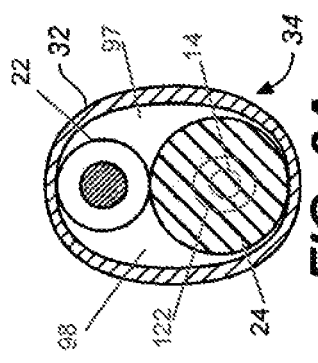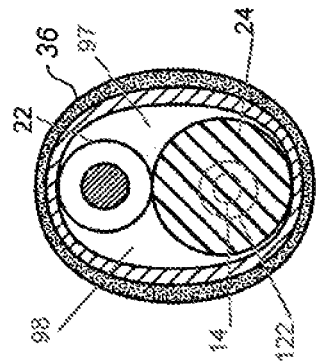

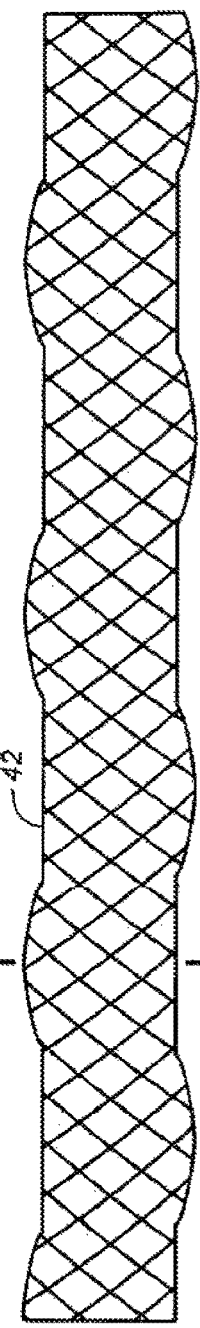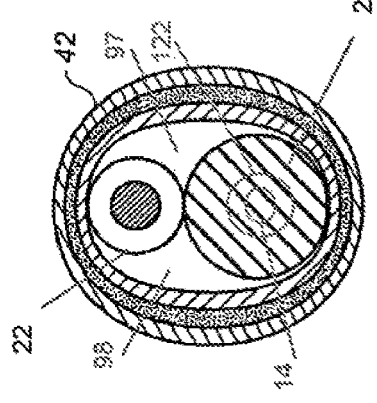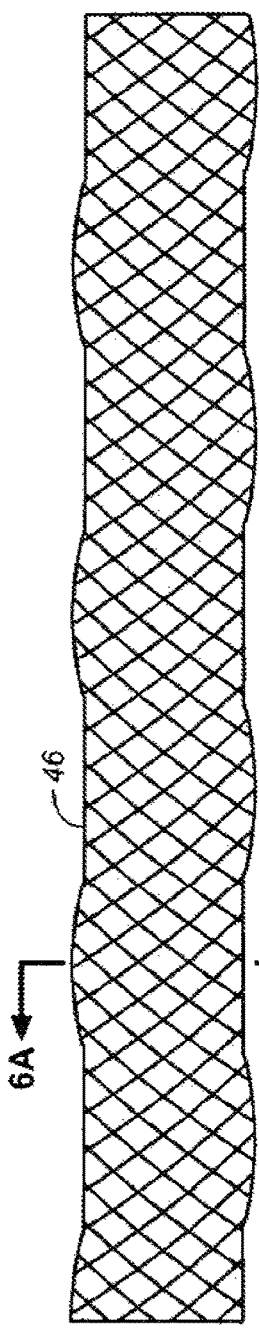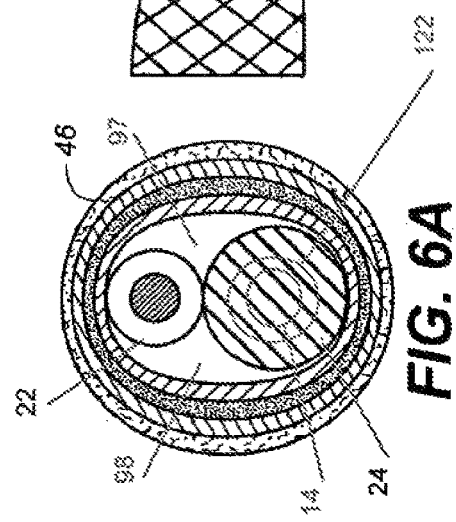

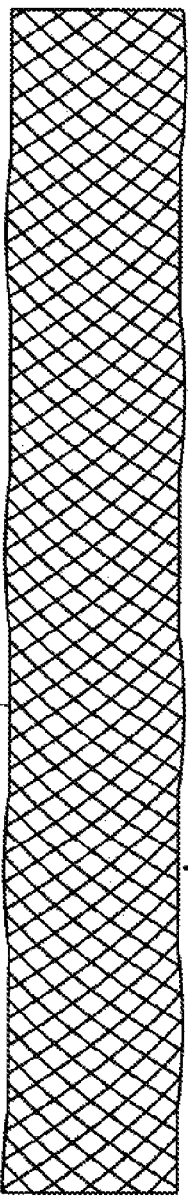
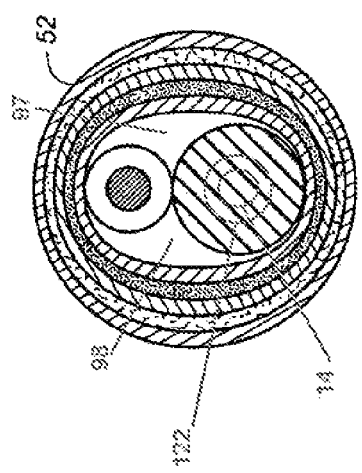
FIG. 7
FIG. 7A
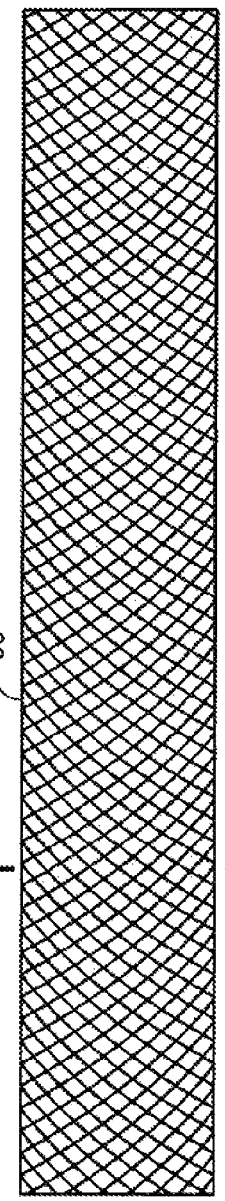
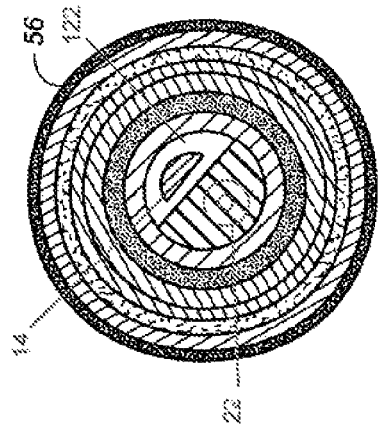
FIG. 8
FIG. 8A

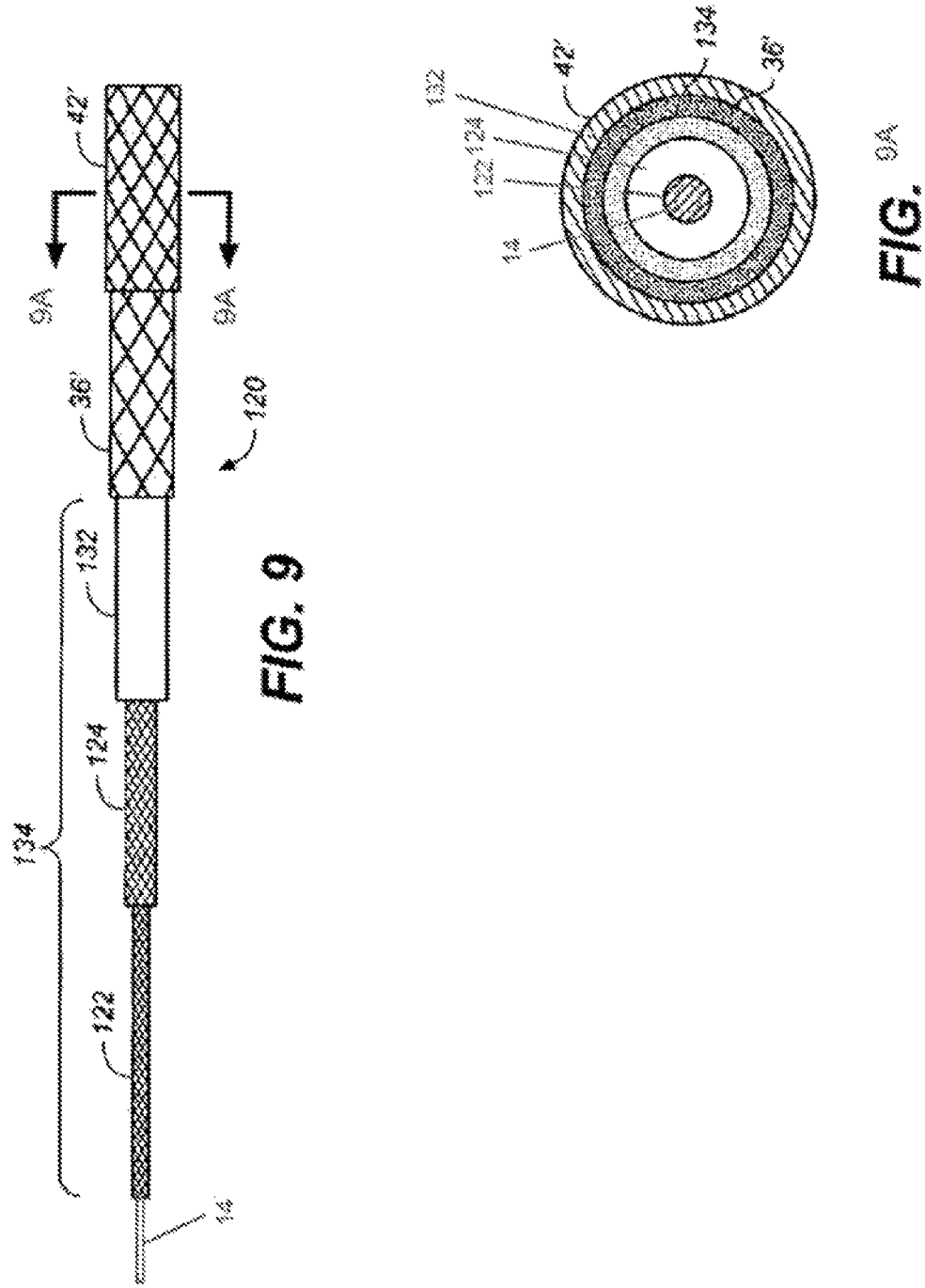

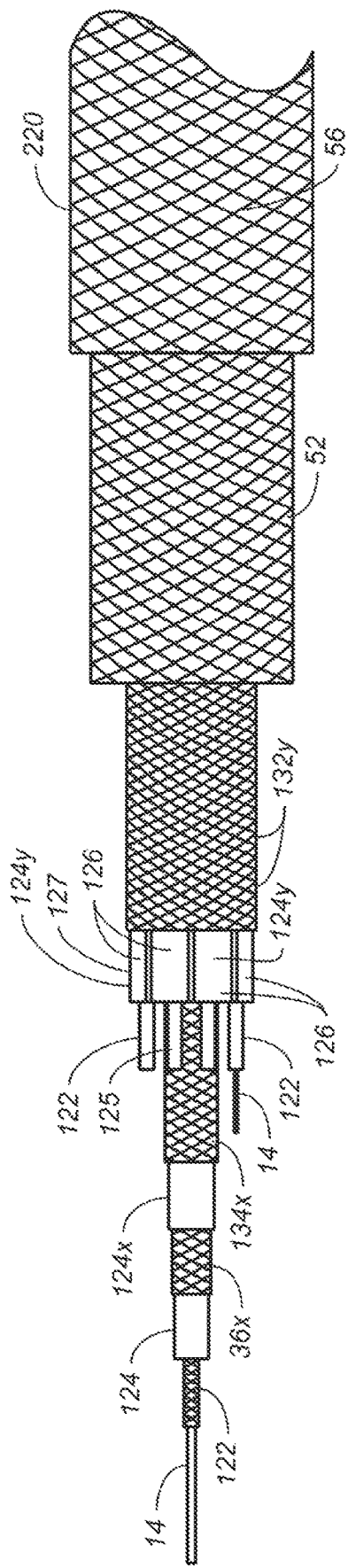

HIGH RESOLUTION HEADLINE SONAR CABLE

This patent application claims priority under 35 U.S.C. 371 from Patent Cooperation Treaty ("PCT") International Patent Application PCT/IS2017/050004 filed 6 Mar. 2017, which claimed priority from United States Provisional Patent Application Ser. No. 62/304,142 filed with the United States Patent and Trademark Office ("USPTO") on 4 Mar. 2016.

TECHNICAL FIELD

The present disclosure relates generally to the technical field of cables and, more particularly, to a cable that is made from a synthetic polymeric material, that is resilient to crushing forces, that exhibits high stiffness and breaking strength, and that includes data signal and/or energy conductors therein.

BACKGROUND ART

A towed trawl usually includes a headline sonar sensor for monitoring the trawl's headline height, the trawl's opening and fish schools in front of the trawl. A data transmission cable, i.e. a headline sonar cable that is sometimes called a third wire includes a conductor for transferring data signals from the headline sonar sensor to the towing vessel. Presently, strength members of conventional headline sonar cables are made from steel, and enclose a central copper conductor that is surrounded by layered, multi-layered and torsion balanced, or braided copper wires. The braided copper wires surrounding the central conductor shield the data signal carried on the central copper conductor from electromagnetic interference that degrades the quality of transmitted data signals. Headline sonar cables can be up to 4000 meters long and, besides their main function of transferring data signals, the cable is also sometimes used to increase trawl's opening by raising the headline. This is why a headline sonar cable is sometimes called a third wire.

When used with a trawl, a headline sonar cable must absorb the stress that results from the trawler's surging on sea swells. Surging causes the stern of the trawler where the third wire winch is located to impart surging shocks to the headline sonar cable being deployed therefrom. Surging significantly increases compressive force applied to the headline sonar cable at the winch thereby correspondingly increasing the likelihood that the headline sonar cable's data signal conductor may become damaged.

One disadvantage of a conventional steel headline sonar cable is its weight. The weight of a steel headline sonar cable adversely affects trawl operation and fishing gear's performance. A long steel headline sonar cable extending between a trawler and a trawl will, between the trawler the headline sonar, descend below the trawl's headline. Furthermore, a trawler's headline sonar cable winch frequently lacks sufficient power to tense the steel headline sonar cable since the winch is supporting the cable's weight.

A steel headline sonar cable that descends below the trawl's headline necessarily passes through schools of fish that are in front of the trawl's opening. Passage of the steel headline sonar cable through a school scares the fish and the school will turn sideways. A schools' sideways turn may reduce the catch because some of the fish avoid the trawl's opening.

Another disadvantage of a steel headline sonar cable occurs if the cable breaks. A broken steel headline sonar cable, due to its weight, initially falls downward and then starts cutting through and damaging the trawl. Similarly, when the trawler turns while towing a trawl it often becomes difficult to control a steel headline sonar cable to avoid contact between the cable and the trawl's warp lines and/or the bridles. Contact between the headline sonar cable and the trawl's warp lines and/or bridles can damage either or both the headline sonar cable and the trawl's warp lines and/or bridles. Similarly, sometimes a headline sonar cable contacts a trawl door. Contact between a headline sonar cable and a trawl's door can result either in the cable being cut, or the cable becoming entangled with the door so the trawl door become uncontrollable. Curing any of the preceding problems associated with the use of a steel headline sonar cable requires retrieving, repairing and/or readjusting the fishing gear.

Over time rust also degrades a steel headline sonar cable. Furthermore, steel headline sonar cables are difficult to splice because they typically consists of two twisted layers of steel wires, one layer twisted clockwise and the layer other counterclockwise.

Cables made from synthetic polymeric materials exhibit rather different physical properties compared to conductors, e.g. optical fibers and wires made from copper, aluminum or other metals. In general, the elasticity of conductors is very low while synthetic polymeric materials generally exhibit greater inherent elasticity. Twisting stranding and/or braiding fibers and/or filaments of synthetic polymeric materials into a cable further increases elasticity of the finished cable due to voids that occur between fibers and/or filaments. A straight conductor oriented parallel to or inside a cable made from synthetic polymeric materials tends to break upon an initial application of tension which stretches the cable. The constructional elasticity of cables made from synthetic polymeric materials can be reduced by stretching the cable either while it is hot or cold. Stretching a cable made from synthetic polymeric materials reduces elasticity by compressing the fibers and/or filaments while also removing voids.

Fibers and/or filaments made from ultra high strength synthetic polymeric materials like Ultra High Molecular Weight Polyethylene ("UHMWPE"), HMPE, Kevlar®, and Twaron® carbon fibers; aromatic polyester, e.g. Vectran®; thermoset polyurethane. e.g. Zylon® and aromatic copolyamid, e.g. Technora®; typically have elongation to break from 2-10%. A cable made from such materials generally exhibit 2-5% constructional elongation. If a conductor is placed inside or with a cable made from such a synthetic polymeric material it must be able to accept this elongation without either breaking or becoming brittle which ultimately results in premature conductor failure.

Tension bearing energy and data signal cables using synthetic fibers for a strength member are known. For example Cortland Cable Company offers such cables for seismic/magneto-meter tow cables, side-scan sonar and video tow cables and seismic ocean bottom cables. Such cables when used for tethering a remotely operated vehicle ("ROV") operate at low tension and insignificant surge. Strong surge shocks are unusual for current applications of ROV tether lines and moored ocean cables or the other uses for known non-steel tension bearing energy and data signal cables. In fact, it is well known in the field that ROV's are not to be deployed with such tether cables in surge conditions in which trawler's usually routinely and actually operate.

In fact, it is accurate to state that when high tension is required in combination with repeated windings under tension onto a winch's drum and storage under tension on that drum such as occurs with a trawl's headline sonar cable, it is not the predominant choice of the industry to form a tension bearing data signal cable having a conductor enclosed by a strength member formed of synthetic fibers. One of the reasons for the industries continuing reliance on heavy, steel strength membered data signal cables is that many past experiments at sheathing conductors (including fiber optic lines, copper wires, etc.) within strength members such as braided jacket layers formed of synthetic polymeric fibers have either failed in high tension applications, such as those high tension applications described above, or have failed to provide a level of resolution, that is a quality of the signal received, that is same or better as traditional constructions signal resolution.

WO 2004/020732 discloses a cable having a thermoplastic core enclosed within a braided, coextruded or pultruded jacket. During fabrication the cable is heated to a temperature at which the thermoplastic core becomes liquid or semiliquid. While heated to this temperature, the cable is stretched so it becomes permanently elongated. During stretching, material of the heated thermoplastic core fill voids within the surrounding jacket. For added strength and/or stiffness, the thermoplastic core may include a central, inner strength member fiber or filament that differs from that of the thermoplastic core and is made from a metal or polymeric material. Using the metal central inner strength member to carry data signals doesn't work because during cable fabrication either the metallic wire either breaks or becomes so brittle as to fail prematurely.

In attempt to remedy the long felts needs in the industry applicant's prior application WO 2009/142766 proposes a non-steel tension bearing data signal and energy cable capable of tolerating very high loads such as those applied to a trawl's headline sonar cable while also capable of being wound on a drum or winch under high tensions and that can be wound and deployed from a winch subject to a fishing trawler's surging shocks while not impairing the cable in a short time, especially in less than twenty-four calendar months from a date of first use. While these teachings have met with some acceptance in the industry, the need continues to improve the signal resolution, that is the quality of the data signal received in the return loop for the headline sonar cable we previously proposed.

DISCLOSURE

An object of the present disclosure is to provide a non-steel headline sonar cable capable of being wound on a winch under tensions and surging shocks experienced by a fishing trawler that remains unimpaired throughout a commercially practical interval of at least 24 calendar months from a date of first use, and more especially, that has a higher signal resolution than applicant's prior taught non-steel headline sonar cable described in WO 2009/142766.

Another object of the present disclosure is to provide a non-steel headline sonar cable capable of being wound on a winch and remaining unimpaired under tensions and surging shocks experienced by, for example, fishing trawlers and seismic vessels, particularly those having displacements exceeding 100 tonnes and even exceeding 3000 tonnes.

Another object of the present disclosure is to provide a non-steel headline sonar cable capable of being wound on a winch at a tension exceeding 100 kg that remains unimpaired throughout a commercially practical interval of at least 24 calendar months from a date of first use on trawlers or seismic vessels exceeding 200 tonnes displacement.

Another object of the present invention is to provide a non-steel headline sonar cable that does not kink when relaxed.

Disclosed is a method for producing a headline sonar cable having a high breaking-strength and lighter weight than a conventional headline sonar cable having a strength member formed mainly or exclusively of steel wire. Most broadly, the method for producing the headline sonar cable is characterized by the steps of; a. providing an elongatable internally-located conductive structure that is adapted for data signal transmission and that includes at least one conductor; and b. braiding a strength-member jacket layer of polymeric material to enclose the elongatable internally-located conductive structure while ensuring that the elongatable internally-located conductive structure remains elongatable, i.e. is not full elongated, e.g. is slack, during the steps of surrounding the elongatable internally-located conductive structure with the strength-member jacket layer, and also, resultantly, when surrounded by the strength-member jacket layer. Produced in this way, the elongatable internally-located conductive structure retains its ability to elongate during further desired processing steps, and especially it does not break upon stretching of the strength-member jacket layer surrounding the elongatable internally-located conductive structure when stretching the strength member jacket layer under heat, especially heat over 80° C. to 145° C., and especially at tensions from 7 to 35% and preferably 7 to 15% of the breaking strength of the pre-stretched strength member jacket layer, such heat-stretching being done so as to permanently elongate both the elongatable internally-located conductive structure as well as the strength member jacket layer simultaneous to one another, followed by simultaneously permitting to cool and/or cooling both the elongatable internally-located conductive structure as well as the strength member jacket layer, while maintaining a tension needed to retain the elongated headline sonar cable at a determined amount of elongation from its initial length, thereby permanently lengthening the headline sonar cable a predetermined amount while simultaneously not breaking or causing to become brittle the conductor.

In a preferred embodiment of the preceding method, the elongatable internally-located conductive structure is formed by coupling a conductor 122 that is capable of data signal and/or electrical energy transmission to a first strength member 14 (preferably, such coupling is effected prior to using the conductor for any other processing steps); and, subsequently coupling the combination of the electrical energy conductor 122 that is coupled to the first strength member 14 to a layer 24 of thermoplastic material that is capable of reaching a molten phase and that thus deforms during subsequent heat-stretching of the strength-member jacket layer. Preferably, such coupling is accomplished by enclosing the combination of the electrical energy conductor 122 that is coupled to the first strength member 14 within the layer 24 of thermoplastic material, such as may be accomplished by extruding and/or pultruding the layer of thermoplastic material about the combination of the electrical energy conductor 122 coupled to the first strength member 14.

In one embodiment of the preceding method, the elongatable internally-located conductive structure is formed by coupling an unstretched and/or elongatable braided conductor 122 that is capable of data signal and/or electrical energy transmission to a cord formed of braided fibers and/or filaments having, preferably but optionally, a softening temperature that is higher than the softening temperature of the thermoplastic material. The electrical energy conductor 122 may be enclosed within a non-conductive braided sheath prior to and/or after forming the layer 24 of thermoplastic around the combination of the conductor 122 and the first strength member 14 to which it is coupled. Or, alternatively, and presently preferred, the conductor 122 and the first strength member 14 to which it is coupled and the layer 24 of thermoplastic that is formed around the combination of the conductor 122 and the first strength member 14 to which it is coupled may be enclosed within a non-conductive braided sheath 32 after forming the layer 24 of thermoplastic material around the conductor 122 and the first strength member 14. Preferably, the non-conductive sheath 32, also known herein as a sheath layer 32, is formed by tightly braiding about and around the exterior surface of the layer 24 of thermoplastic material that is formed around the combination of the conductor 122 and the first strength member 14 a hollow braided sheath of polyester fibers and/or fibers having a higher softening temperature (e.g. higher softening point) in comparison to a softening temperature/softening point of the thermoplastic material forming the layer 24 of thermoplastic material.

Most preferably, and importantly, the braid angle selected when forming the braided conductor is more obtuse in comparison to the braid angle selected for the initial formation with a braiding machine of the strength-member jacket layer 52. The braid angle for the braided conductor is selected so that the braided conductor can be elongated a minimum of four percent (4%) and preferably so that it can be elongated by at least 14% without causing breakage of copper filaments forming the braided conductor. These values are especially important when forming the braided conductor with a hollow braided construction and when enclosing the first strength member 14 within the hollow braided conductor. Preferably, the step of enclosing the first strength member 14 within the (preferably) hollow braided conductor is accomplished by first providing a strength member 14; and, secondly, by passing and/or feeding the first strength member 14 through a braiding machine loaded with filaments and/or fibers used to form the braided conductor, such as may be copper filaments, and using the braiding machine to form a hollow braided conductor 122 around and about a predetermined length of the first strength member 14.

For a metallic conductor or braided conductor, either of the preceding alternative embodiments includes further steps of:
1. after braiding the strength-member jacket layer 52 (not to be confused with the first strength member 14) around the elongatable internally-located conductive structure (that itself preferably includes a strength member 14):
   a. heating the headline sonar cable; and
   b. applying tension to the strength-member jacket layer so as to permit stretching of the strength-member jacket layer sufficient to elongate the headline sonar cable to cause a reduction in the cross-sectional area of the strength-member jacket layer; and
2. while maintaining tension on the strength-member jacket layer, cooling the headline sonar cable.

A tension is selected and a heat is selected so that not only do thermoplastic materials in the headline sonar cable become molten, and also the material forming the strength-member jacket layer 52 becomes more easily creeped without inducing failure, but the tension, heat, and time period which the tension and heat are applied are selected so that a reduction in overall external diameter of the headline sonar cable of from six percent to thirty-five percent, and more preferably of from twelve percent to twenty-five percent is attained from prior to the stretching step to after the stretching step.

Also disclosed is a non-steel headline sonar cable (meaning a headline sonar cable having its primary load bearing strength member formed mainly and/or entirely of non-steel fibers) fabricated in accordance with the disclosed method. An advantage of the disclosed non-steel headline sonar cable is that it is lighter and has less density than known headline sonar cables having strength members formed exclusively of steel wires. Because the disclosed non-steel headline sonar cable is lighter than, and correspondingly more buoyant in water than, a conventional steel headline sonar cable, the disclosed headline sonar cable is:
  1. easier to handle and keep out of the trawl's path;
  2. reduces the power required for trawler equipment that handles the cable.
  3. reduces the weight stored on winches aboard ship in comparison to steel headline sonar cables, and thus reduces forces destabilizing the vessel, thereby increasing safety.

Due to the disclosed headline sonar cable's low weight and buoyancy, its path from a trawler's winch down to the trawl's headline is more direct. Furthermore, due both to the disclosed headline sonar cable's low weight and to the trawl's towing speed, the disclosed headline sonar cable tends to remain above the trawl's headline rather than descending below the headline. If a headline sonar cable remains above the trawl's headline, it cannot contact the trawl's warp lines, bridles and/or doors. Furthermore, if such a headline sonar cable breaks it will float over the trawl thereby avoiding damage to the trawl.

Another advantage of the disclosed non-steel headline sonar cable is that it can be spliced more easily and more quickly than a conventional steel headline sonar cable.

Yet another advantage of the disclosed non-steel headline sonar cable is that it corrodes less than a conventional steel headline sonar cable. Consequently, the disclosed non-steel headline sonar cable will last longer than a conventional steel headline sonar cable.

Yet another advantage of the disclosed non-steel headline sonar cable is that it exhibits less heat fatigue than a conventional steel headline sonar cable.

Possessing the preceding advantages, the disclosed non-steel headline sonar cable answers needs long felt in the industry.

These and other features, objects and advantages will be understood or apparent to those of ordinary skill in the art from the following detailed description of the preferred embodiment as illustrated in the various drawing figures.

BRIEF DESCRIPTION OF DRAWINGS

FIG. 1 is a plan view of a headline sonar cable in accordance with the present disclosure that reveals various layers included in one embodiment thereof;

FIG. 1A is a cross-sectional view that depicts those layers of the headline sonar cable which appear at the line 1A-1A in FIG. 1 as those layers appear in the finished headline sonar cable;

FIG. 2 is a plan view illustrating a fiber optic conductor such as may be a coaxial cable that is capable of data transmission wrapped around a layer of thermoplastic material that both deforms during subsequent tensioning of an enclosing strength-member jacket layer and that also encloses at least one electrical energy conductor, all of which are included in the headline sonar cable depicted in FIG. 1;

FIG. 2A is a cross-sectional view showing the deformable layer of thermoplastic material with the data transmission conductor wrapped therearound and the at least one electrical energy conductor contained therein, taken along the line 2A-2A in FIG. 2;

FIG. 3 is a plan view illustrating the fiber optic conductor wrapped in a spiral around the thermoplastic layer of the headline sonar cable depicted in FIG. 2 after being enclosed within a sheath layer of material that has a higher softening temperature than that of the thermoplastic layer;

FIG. 3A is a cross-sectional view of the fiber optic conductor; the thermoplastic layer, and the electrical energy conductor contained within the thermoplastic layer, of FIG. 2, all enclosed within the sheath layer, that is taken along the line 3A-3A in FIG. 3;

FIG. 4 is a plan view illustrating the fiber optic conductor; the thermoplastic layer; the electrical energy conductor contained within the thermoplastic layer; and the sheath layer of the headline sonar cable depicted in FIG. 3, all after being enclosed within a shielding layer of electrically conductive material;

FIG. 4A is a cross-sectional view of the fiber optic conductor; the thermoplastic layer; the electrical energy conductor enclosed within the thermoplastic layer; and the sheath layer, all of FIG. 3, all enclosed within the shielding layer that is taken along the line 4A-4A in FIG. 4;

FIG. 5 is a plan view illustrating the fiber optic conductor; the thermoplastic layer; the electrical energy conductor contained within the thermoplastic layer; the sheath layer; and the shielding layer of the headline sonar cable depicted in FIG. 4, all after being enclosed within an optional water-barrier layer of material;

FIG. 5A is a cross-sectional view of the fiber optic conductor, the thermoplastic layer; the electrical energy conductor enclosed within the thermoplastic layer; the sheath layer; and the shielding layer of FIG. 4, all enclosed within the water-barrier layer that is taken along the line 5A-5A in FIG. 5;

FIG. 6 is a plan view illustrating the fiber optic conductor; the thermoplastic layer; the electrical energy conductor enclosed within the thermoplastic layer; the sheath layer; the shielding layer; and the water-barrier layer of the headline sonar cable depicted in FIG. 5, all after being enclosed within an extrusion-barrier layer of material;

FIG. 6A is a cross-sectional view of the fiber conductor; the thermoplastic layer; the electrical energy conductor enclosed within the thermoplastic layer; the sheath layer; the shielding layer; and the water-barrier layer of FIG. 5, all enclosed within the extrusion-barrier layer that is taken along the line 6A-6A in FIG. 6;

FIG. 7 is a plan view illustrating the fiber optic conductor; the thermoplastic layer; the electrical energy conductor enclosed within the thermoplastic layer; the sheath layer; the shielding layer; the water-barrier layer; and the extrusion-barrier layer of the headline sonar cable, depicted in FIG. 6, all after being enclosed within the strength-member jacket layer of polymeric material;

FIG. 7A is a cross-sectional view of the fiber optic conductor; the thermoplastic layer; the electrical energy conductor enclosed within the thermoplastic layer; the sheath layer; the shielding layer; the water-barrier layer; and the extrusion-barrier layer, of FIG. 6, all enclosed within the strength-member jacket layer that is taken along the line 7A-7A in FIG. 7;

FIG. 8 is a plan view illustrating the fiber optic conductor; the thermoplastic layer; the electrical energy conductor enclosed within the thermoplastic layer; the sheath layer; the shielding layer; the water-barrier layer; the extrusion-barrier layer; and the strength-member jacket layer of the headline sonar cable, depicted in FIG. 7, all after being enclosed within a protective layer of material;

FIG. 8A is a cross-sectional view of the fiber optic conductor; the thermoplastic layer; the electrical energy conductor enclosed within the thermoplastic layer; the sheath layer; the shielding layer; the water-barrier layer; the extrusion-barrier layer; and the strength-member jacket layer, of FIG. 7, all enclosed within the protective layer that is taken along the line 8A-8A in FIG. 8;

FIG. 9 is a plan view of a portion of an alternative embodiment for an elongatable centrally-located conductive structure included in a most preferred alternative embodiment of the headline sonar cable depicted in FIGS. 1, 1A, 2-8 and 2A-8A, and lacking the fiber optic conductor spiraling around the layer of thermoplastic material enclosing the electrical energy conductor;

FIG. 9A is a cross-sectional view that depicts those layers of the alternative embodiment headline sonar cable which appear at the line 9A-9A in FIG. 9 as those layers appear in the finished headline sonar cable.

FIG. 10 is a plan view of an alternative embodiment of the headline sonar cable having an alternative elongatable centrally located conductive structure.

BEST MODE FOR CARRYING OUT THE DISCLOSURE

Figure 11:
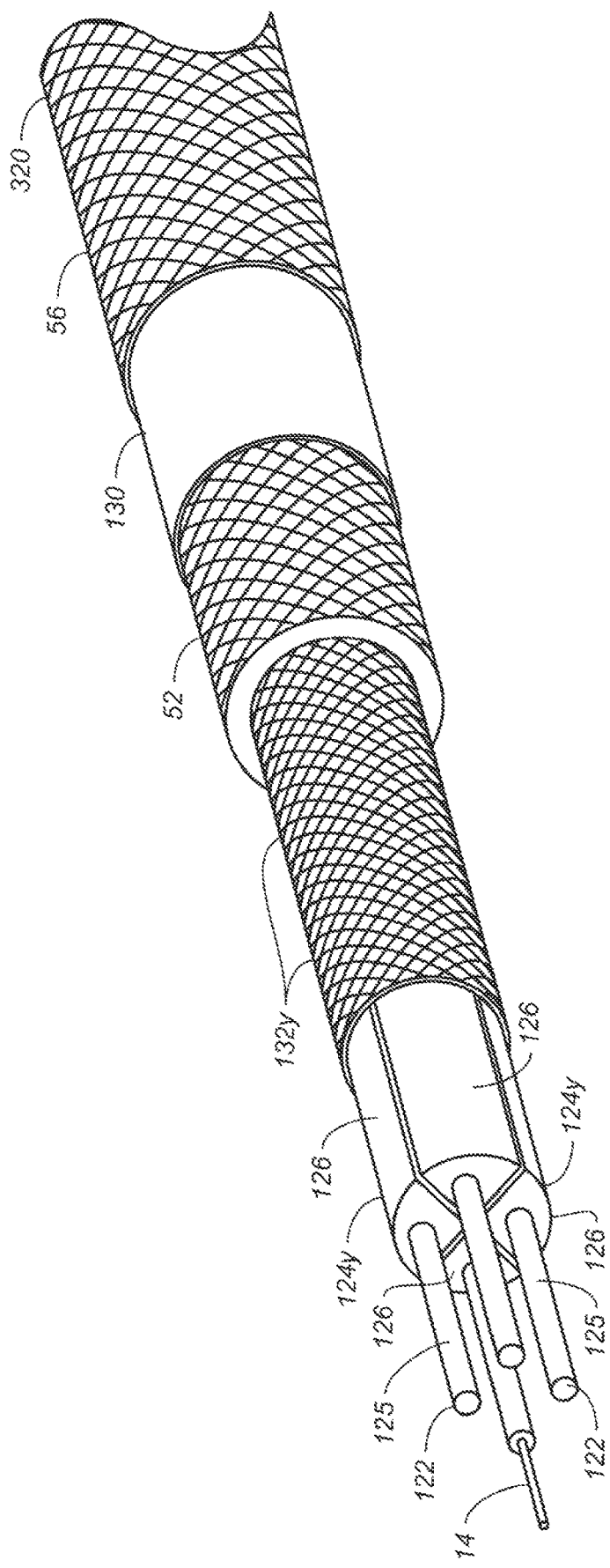
FIG. 11 is a perspective view of another alternative, embodiment of the headline sonar cable having an alternative elongatable centrally located conductive structure that differs from the alternative elongatable centrally located conductive structure of FIG. 10.

FIG. 1 illustrates a headline sonar cable in accordance with the present disclosure that is identified by the general reference character 20. FIG. 1 depicts a preferably insulated electrical conductor 122 coupled to a first strength member 14, the combination of the electrical conductor 122 and the first strength member 14 enclosed within a layer 24 of deformable material. A fiber optic conductor 22 is wrapped in spiral form around the layer of deformable material and therefore as well is wrapped around the combination of the electrical energy conductor 122 coupled to the first strength member 14, as these are contained within the layer 24 of deformable material. The layer 24 of deformable material enclosing the combination of the electrical energy conductor 122 coupled to the first strength member 14, and the fiber optic conductor 22 wrapped in spiral form around the layer 24 of deformable material, all being enclosed within a sequence of layers included in the particular embodiment of the headline sonar cable 20 illustrated in FIG. 1. The steps of a first fabrication method described below assemble the headline sonar cable 20 depicted in FIG. 1.

The First Fabrication Method:

Step (1)

Fabrication of the headline sonar cable 20 depicted in FIG. 1 begins with coupling an electrical conductor 122 to a first strength member 14. Next, a layer 24 of deformable material is formed about the combination of the electrical conductor 122 coupled to the first strength member 14. The layer 24 of deformable material preferably is a thermoplastic material, such as Polyethylene, such as cellular Polyethylene. The preferred method of coupling the electrical conductor 122 to the first strength member 14 is to form the electrical conductor at the moment it is being coupled to the first strength member 14. A preferred method to accomplish this is to braid an electrical energy conductor about the first strength member 14. A useful first strength member 14 for this process is a braided twine or cord, that can be made of synthetic or natural filaments. A parallel lay or twisted lay twine or cord also is useful, as is a single monofilament of a circular cross sectional form, though almost any cross sectional form is useful. A preferred property for the first strength member 14 is that it has less ability to elongate than does the electrical conductor, especially at temperatures lesser than 50° C., such as at 20° C. Most preferably, the first strength member 14 has a range of elongation measured at 5 kg tension and at 20° C. that is from no elongation up to a maximum of 3% elongation.

After forming the structure that includes the combination of the electrical energy conductor 122 coupled to the first strength member 14 where the electrical energy conductor 122 and the first strength member 14 are enclosed within a layer of thermoplastic material, an optional step in the fabrication process, that is used when making one preferred embodiment of the present disclosure, is to wrap at least one fiber optic cable in spiral form around the exterior of the thermoplastic layer, as depicted in greater detail in FIGS. 2 and 2A. The deformable material of the layer 24 can be a thermoplastic material, a plastic material, or any other material that deforms when exposed to pressures generated while stretching various layers of the headline sonar cable 20 depicted in FIG. 1 in the manner described in greater detail below.

An essential characteristic of the present disclosure is that all subsequent processing steps including a step of stretching various layers of the headline sonar cable 20 depicted In FIG. 1 preserves the integrity of the electrical energy conductor 122, and, in the case where it has been chosen to include the at least one fiber optic conductor 22, also preserves the integrity of the at least one fiber optic conductor 22.

Regarding the fiber optic conductor 22 and/or the electrical energy conductor 122, any insulation thereon: 1. has a higher softening temperature than that of the preferably thermoplastic layer 24; while 2. being deformable during stretching various layers of the headline sonar cable 20 in the manner described in greater detail below. There exist numerous conventional insulating materials that satisfy the preceding criteria for an insulator included in the headline sonar cable 20.

The fiber optic conductor can be a coaxial cable. The shape of the fiber optic conductor 22 when twisted and/or wrapped around the layer 24 is that of a spiral, although in accordance with the present disclosure the fiber optic conductor may be twisted and/or wrapped around the layer 24 in shapes other than that of a spiral or helix which alternative shapes also function as well in the headline sonar cable 20 as the spiral shape. In fact, any suitably arranged configuration for the headline sonar cable 20 in which the fiber optic conductor 22 meanders along the length of the layer 24 should be capable of providing sufficient slack so that it does not break while stretching various layers of the headline sonar cable 20 depicted in FIG. 1 in the manner described in greater detail below.

The conductive material of the headline sonar cable 20 includes fibers and/or filaments for carrying information. In accordance with the present disclosure such information carrying fibers and/or filaments include optical fibers and electrically conductive wire. Usually, the headline sonar cable 20 includes filaments capable of carrying electrical energy and/or current, such as copper strands or wires. For purposes of this disclosure, the terms fiber and filament are used interchangeably.

Step (2)

Referring now to FIGS. 3 and 3A, the next step in forming the headline sonar cable 20 is enclosing (including forming a sheath 32 over): selected embodiment of the headline sonar cable of the present disclosure, selected from a group consisting of:

I) the deformable layer 24 enclosing the combination of the electrical energy conductor 122 coupled to the first strength member 14; or II) the combination of the at least one fiber optic conductor 22 spiraled around the layer 24 enclosing the combination of the electrical energy conductor 122 coupled to the first strength member 14.

Preferably, the structures described in Step (2), (I) and (II) immediately above are enclosed within a sheath layer 32 of material that has a higher softening temperature than that of the layer 24. If tightly braided, wrapped or extruded material of the sheath layer 32 has a higher softening temperature than the material of layer 24, the material of the layer 24 does not extrude or mainly does not extrude through the sheath layer 32 during prestretching and/or heat setting most of the cable layers depicted in FIG. 1 in the manner described in greater detail below. The sheath layer 32 may be formed by tightly braiding polyester fibers, having a higher softening temperature than that of the layer 24, about the layer 24 containing the combination of the electrical energy conductor 122 coupled to the first strength member 14, as in Step (2) (I) above; or, alternatively, the sheath layer 32 may be formed about the combination of the at least one fiber optic conductor 22 spiraled around the layer 24 containing the combination of the electrical energy conductor 122 coupled to the first strength member 14, as in Step (2) (II) above, both alternatives forming alternative embodiments of a preferred elongatable internally-located conductive structure 34 of the headline sonar cable 20.

Step (3)

Referring now to FIGS. 4 and 4A, the next step in forming the headline sonar cable 20 is overbraiding or overtwisting about the sheath layer 32 of FIG. 3, and all contained within it, with a shielding layer 36 of electrically conductive material, e.g., copper wires, to shield at least the electrical conductor 122 from electromagnet interference. The shielding layer 36 must remain unimpaired when elongating up to fourteen percent (14%) and even up to nineteen percent (19%) while stretching various layers of the headline sonar cable 20 depicted in FIG. 1 in the manner described in greater detail below.

Step (4)

Referring now to FIGS. 5 and 5A, the next step in forming the headline sonar cable 20 is to pultrude or extrude, cover or otherwise enclose (including forming a sheath over) the shielding layer 36, and all contained within it, with a water-barrier layer 42 to serve as a water shield. Preferably polyethylene forms the water-barrier layer 42. Preferably, and contrary to the state of the art and the teachings in the industry, the water barrier layer is formed with greater thickness than minimally required for a water barrier layer, and preferably with a thickness and/or a material volume that is greater than the material volume used in forming the layer 24 of thermoplastic material; and/or, preferably also, and contrary to the state of the art and the teachings in the industry, the water barrier layer is formed both with greater thickness than minimally required for a water barrier layer, and preferably with a volume of material that is greater than a volume of material of any fiber optic conductor 22 used in the headline sonar cable 20 of the present disclosure, including greater than the volume of any coaxial cable used for the fiber optic conductor 22.

Step (5)

Referring now to FIGS. 6 and 6A, the next step in forming the headline sonar cable 20 is to overbraid or cover the water-barrier layer 42 and all that is contained within it with a tightly braided or wrapped extrusion-barrier layer 46 of a material having a higher softening temperature than the material of the water-barrier layer 42. If tightly braided, wrapped or extruded material of the extrusion-barrier layer 46 has a higher softening temperature than the material of the water-barrier layer 42, the material of the water-barrier layer 42 does not and/or mainly does not extrude through the extrusion-barrier layer 46 during prestretching and/or heat setting most of the cable layers depicted in FIG. 1 in the manner described in greater detail below. For example, the extrusion-barrier layer 46 may be formed from braided polyester fibers (including plaits, strands and filaments and other).

Step (6)

Whatever combination of layers are included in the headline sonar cable 20, the next step in forming the headline sonar cable 20 is to overbraided over all those layers with a layer of polymeric fiber such as UHMWPE, HMPE, Aramids (Kevlar), carbon fibers, LCP (Vectran), PBO (Zylon), Twaron and Technora, etc. to form the strength-member jacket layer 52 of the headline sonar cable 20.

Step (7)

A predetermined tension is now applied to the strength member jacket layer 52, and thus by extension to all it contains, including but not limited to: the first strength member 14; the electrical conductor 122, the deformable layer 24; the sheath layer 32; the shielding layer 36; the water barrier 42; the extrusion-barrier layer 46. The strength-member jacket layer 52, together with any other layers enclosed within the strength-member jacket layer 52, and the strength-member jacket layer 52 itself, are then heat-stretched in such a way as to cause the layer 24 and the water barrier 42 as well as any other thermoplastic layers to become malleable (semi-soft) and most preferably to become molten ("semi-liquid") so these layers and any other thermoplastic layers can be permanently deformed, and otherwise in such a way as described below. A key determining factor for the predetermined tension is to use a tension that applies a load to at least the strength-member jacket layer 52, prior to applying the heat that causes thermoplastic materials in the headline sonar cable to become molten, that stops the fibers and/or filaments forming the strength-member jacket layer 52 from looing their strength upon application of the heat, or mainly stops them from losing strength upon application of the heat.

Step (8)

The headline sonar cable 20 preferably is heated to a temperature that causes the deformable layer 24 and other thermoplastic layers to become both malleable and moldable, for example, especially molten (semi-liquid) so they become permanently deformable but not so hot that their thermoplastic material is liquid. While maintaining the headline sonar cable 20 in this heated state, fabrication of the headline sonar cable 20 concludes with performing the operations described in Steps below.

Step (9)

The next fabrication step is stretching the headline sonar cable 20 applying sufficient tension to at least the strength-member jacket layer 52 so as to elongate the strength-member jacket layer 52 a desired amount. The desired amount of elongation of the strength-member jacket layer 52 is usually an amount that after the headline sonar cable 20 cools the strength-member jacket layer 52 is unable to stretch more than approximately three and one-half percent (3.5%) until breaking, and more preferably so that it is unable to stretch more than half a percent (0.5%) until breaking, and especially so as to permit permanent elongation of the cooled jacket layer.

The heat and tension are selected so that fibers and/or filaments forming the strength-member jacket layer 52 are also permanently elongated. The permanent elongation of the fibers and/or filaments forming the strength-member jacket layer 52 is preferably to an extent that loads applied to the headline sonar cable are also applied to all the fibers and/or filaments forming the strength-member jacket layer.

A preferred temperature when stretching the headline sonar cable 20 when the strength-member jacket layer 52 is formed of UHMWPE is 117° C. A temperature between 114° C. to 117° C. is highly useful. A temperature between 110° C. to 120° C. is useful, with a temperature range 100° C. to 124° C. also being useful. Depending upon the tension applied to the strength-member jacket layer 52 of the headline sonar cable 20, and also depending upon the types of fibers and/or filaments used in making the headline sonar cable 20, temperatures from 90° C. to 150° C. are useful.

In general, applying more tension to the headline sonar cable 20 reduces the temperature to which the headline sonar cable 20 must be heated, and conversely. The temperature selected and applied and the tension selected and applied are such as to maximize the strength of the jacket layer in the headline sonar cable 20 while also minimizing, and preferably eliminating, its ability to further elongate;

Step (10)

The final fabrication step is cooling the headline sonar cable 20 while maintaining tension on at least the strength-member jacket layer 52 so that it together with the other layers cool while under tension. In this way: 1. all layers of the headline sonar cable 20 become permanently elongated while also becoming permanently formed into a position and acquiring a shape that supports the internal shape of the tense strength-member jacket layer 52, especially when the strength-member jacket layer 52 is formed with a hollow-braid construction. For example, as a result of this last step, the fiber optic conductor 22, when used, becomes compressed against the malleable layer 24, and as a result displaces some of the layer 24 and actually comes to occupy some of the space formerly occupied only by the layer 24. Due to elongation of the headline sonar cable 20, the diameter in which the fiber optic conductor(s) 22 is/are initially wrapped around the layer 24 shrinks with and becomes embedded within the deformable and preferably thermoplastic layer 24. Depending upon how much tension is applied to the headline sonar cable 20 during fabrication, the combined fiber optic conductor(s) 22 and layer 24 and, often, the water barrier 42 can become pressed against one another to an extent that spaces between these items are often barely discernable or are not discernable.

Due to the heating and stretching described above all layers of the headline sonar cable 20 enclosed within the strength-member jacket layer 52 and the strength-member jacket layer 52 assume a shape that supports and conforms to the internal wall of the immediately surrounding layer. Accordingly, during heating and stretching of the headline sonar cable 20 the extrusion-barrier layer 46, when used, as is in some embodiments optional as the layer 24 may serve as an extrusion barrier layer for the electrical conductor(s) 122, directly contacting the strength-member jacket layer 52 takes a shape that supports and conforms precisely to the internal shape of the strength-member jacket layer 52. Layers of the finished headline sonar cable enclosed within the extrusion-barrier layer 46 assume a shape similar to that of the extrusion-barrier layer 46 with the degree of similarity decreasing progressively toward the center of the headline sonar cable 20.

Step (11)

Lastly, referring to FIG. 8, a cover may be applied to the headline sonar cable 20 by over-braiding or cover-braiding the strength-member jacket layer 52 and everything enclosed within the strength-member jacket layer 52 with a final protective layer 56 of the headline sonar cable 20. The protective layer 56 shields the strength member from damage caused by abrasion or cutting and exposure to chemicals and the elements. HMPW and UHMWPE fibers formed into yarns are especially useful, and can be blended with fibers having higher coefficients of friction than does HMPE or UHMPE to form yarns used for forming a coverbraid over the strength-member jacket layer 52. The cover layer 56 preferably is adhered to the strength-member jacket layer 52 by having a highly elastic and highly resilient adhesive substance situated onto the exterior surface of the strength-member jacket layer 52 prior to and best immediately prior to braided about it the cover layer 56, especially elastic substances having a higher shear strength when set (i.e. "cured") than does silicone.

Preferred Alternative Fabrication Method

FIGS. 9 and 9A and depict a most preferred, alternative embodiment headline sonar cable in accordance with the present disclosure that lacks a fiber optic conductor formed in spiral about a thermoplastic layer enclosing an electrical conductor 122, and is identified by the general reference character 120. Those elements depicted in FIGS. 9 and 9A that are common to the headline sonar cable 20 illustrated in FIGS. 1-8, 1A, and 2A-8A carry the same reference numeral distinguished by a prime ("'") designation. The most preferred embodiment of the headline sonar cable 120 depicted in FIGS. 9 and 9A eliminates the at least one fiber optic conductor 22 formed in a spiral exterior the thermoplastic layer 24 that is exterior the electrical conductor 122 from the elongatable internally-located conductive structure 34. Instead, the headline sonar cable 120 includes an initially unstretched braided electrical conductor 122 that has a polymeric layer formed around it such as by extruding or pultruding a polymeric thermoplastic layer 124 around the braided conductor 122. A non-conductive braided sheath 132 is formed about the polymeric layer 124, and preferably is overbraided around the polymeric layer 124. Preferably, the braided sheath 132 is formed of fibers such as polyester fibers. The polymeric layer 124 is preferably formed from cellular polyethylene and has a radial thickness that establishes a proper electrical impedance for the headline sonar cable 120. The use of cellular polyethylene for electrical insulation is further described at least in U.S. Pat. Nos. 4,173,690, 5,346,926 and 7,507,909 B2 that are hereby incorporated by reference. Alternatively, a polyurethane material may also be used provided that it does not tend to contract the headline sonar cable 20 longitudinally after stretching various layers of the headline sonar cable 20 depicted in FIG. 1 in the manner described in greater detail below.

Configured as described above, the braided conductor 122 formed about the first strength member 14, the polymeric layer 124 formed about the braided conductor, and the braided sheath 132 formed about the polymeric layer 124, together form a most preferred embodiment of an elongatable internally-located conductive structure 134 of the headline sonar cable 120. After the elongatable internally-located conductive structure 134 has been assembled, fabrication of the most preferred, alternative embodiment headline sonar cable 120 then continues with further processing the elongatable internally-located conductive structure 134 as described previously for Steps (3) through (11) above.

Alternative configurations of the elongatable internally-located conductive structure for alternative preferred embodiments of the headline sonar cable Alternatively, as shown in FIG. 10 and FIG. 11, that show alternative preferred embodiments of the headline sonar cable 220 and 320, respectively, disclosed is an alternative configuration for another preferred embodiment of the elongatable internally-located conductive structure 134$x$, that may be used individually in the headline sonar cable, or in severality, or both individually and/or in severality in conjunction with other embodiments of the elongatable internally-located conductive structure.

The alternative preferred elongatable internally-located conductive structure 134$x$ includes: the braided conductor 122 formed about the first strength member 14; the thermoplastic layer 124 formed about the braided conductor 122; a layer of electrically conductive material 36$x$ that preferably is laid or braided copper filaments our is a double layer of torque balanced layered copper filaments in S and Z configuration (e.g. each of the two layers is opposite in lay from the other) is formed about the thermoplastic layer 124; another layer of thermoplastic material 124$x$ is formed about the layer of electrically conductive material 36$x$; and a tightly braided sheath 132$x$ formed preferably of polyester fibers having a higher softening point than that of both thermoplastic layers 124 and 124$x$ is formed about the another thermoplastic layer 124$x$. A preferred material for forming the thermoplastic layers 124 and 124$x$ is cellular polyethylene.

Further Preferred Embodiments Using Alternative Configurations of the Elongatable Internally-Located Conductive Structure In further reference to FIG. 10, an alternative headline sonar cable 220 is shown where multiple conductive power conductors 125 are combined with an alternative elongatable internally-located conducive structure 134$x$ of the present disclosure in order to form an alternative headline sonar cable 220 of the present disclosure. To form the multiple power conductors 125, most preferably: several distinct hollow braided conductors 122 with a first strength member 14 (not shown with all conductors 122 to prevent cluttering the drawing) internal the hollow braided conductor 122 are formed as taught herein and above; secondly a layer of thermoplastic material 124$y$ is extruded and/or pultruded or otherwise formed about each conductor 122 so as to form a sheath layer 124$y$ of thermoplastic material surrounding a length of hollow braided conductor 122, thereby forming a bar 126. Next, several distinct and individual lengths of such bars 126 are provided and assembled into a bundle 127, preferably in parallel lay configuration, where the bundle 127 has at its core an alternative elongatable internally-located conductive structure 134x. The position of the elongatable internally-located conductive structure 134x as shown in FIG. 10, that has been described as at "the core" of the bundle 127, can also optionally be described as being disposed coaxial with the long axis of the headline sonar cable relative to the multiple distinct additional electrical energy conductors 122 as well as relative to the multiple bars 126 and as well relative to the bundle 127. Next, the bundle 127 is retained in the bundle's configuration, either by being wound about by using tape or by being otherwise bound. Next, a sheath 132y of tightly braided material, such as polyester fibers, that is capable of retaining molten phases of the thermoplastic material forming the bars 126 is then formed about the bundle 127. The sheath 132y can be formed as a single layer, or as a two or more layered sheath, shown in FIG. 10 is a two layered sheath 132y. The remainder of the processing steps, starting with forming the strength-member jacket layer 52 about the sheath 132y, continues as described previously for Steps (3) through (11) above to form the alternative headline sonar cable 220.

Alternatively again, by eliminating the internally-located conductive structure 134x from the bundle, a Powerable Warp or Powerable Cable 320 is formed, see FIG. 11. Powerable Cable 320 is not ideal for information transmitting capability, but is a power transmitting cable having a synthetic strength member that is capable of tolerating crushing forces on high tension drums. A polyurethane layer situated between and adhering together the sheath and the strength member jacket layer is useful in all embodiments of the headline sonar cable 20, 120, 220, 320 and 420 (see FIG. 12), and is indicated in FIG. 11 by reference numeral 130.

In headline sonar cable 220 the primary use for the conductor 122 located within the alternative elongatable internally-located conductive structure 134x is delivery of data signals. However, the primary use for the conductors 122 located within the bars 126 is delivery of power. A preferred minimum quantity of bars 126 forming the bundle 127 of (preferably parallel laid) bars is at least three, with at least six to eight bars being presently preferred. More bars can be used, up to thousands. The use of a first strength member 14 with each of the braided conductors contained within each of the bars in the manner as taught herein and above is preferred. A useful construction method for forming the bars and resultant structure is to first provide multiple distinct first strength members 14; then to form around each distinct first strength member 14 a braided conductor 122 preferably as a hollow braided conductor, preferably of copper filaments. Next, to pass each of the braided conductors 122 through an extrusion or pultrusion devise that extrudes and/or pultrudes about each of the braided conductors 122 a layer of thermoplastic material, thus forming an above described bar 126.

Figure 12:
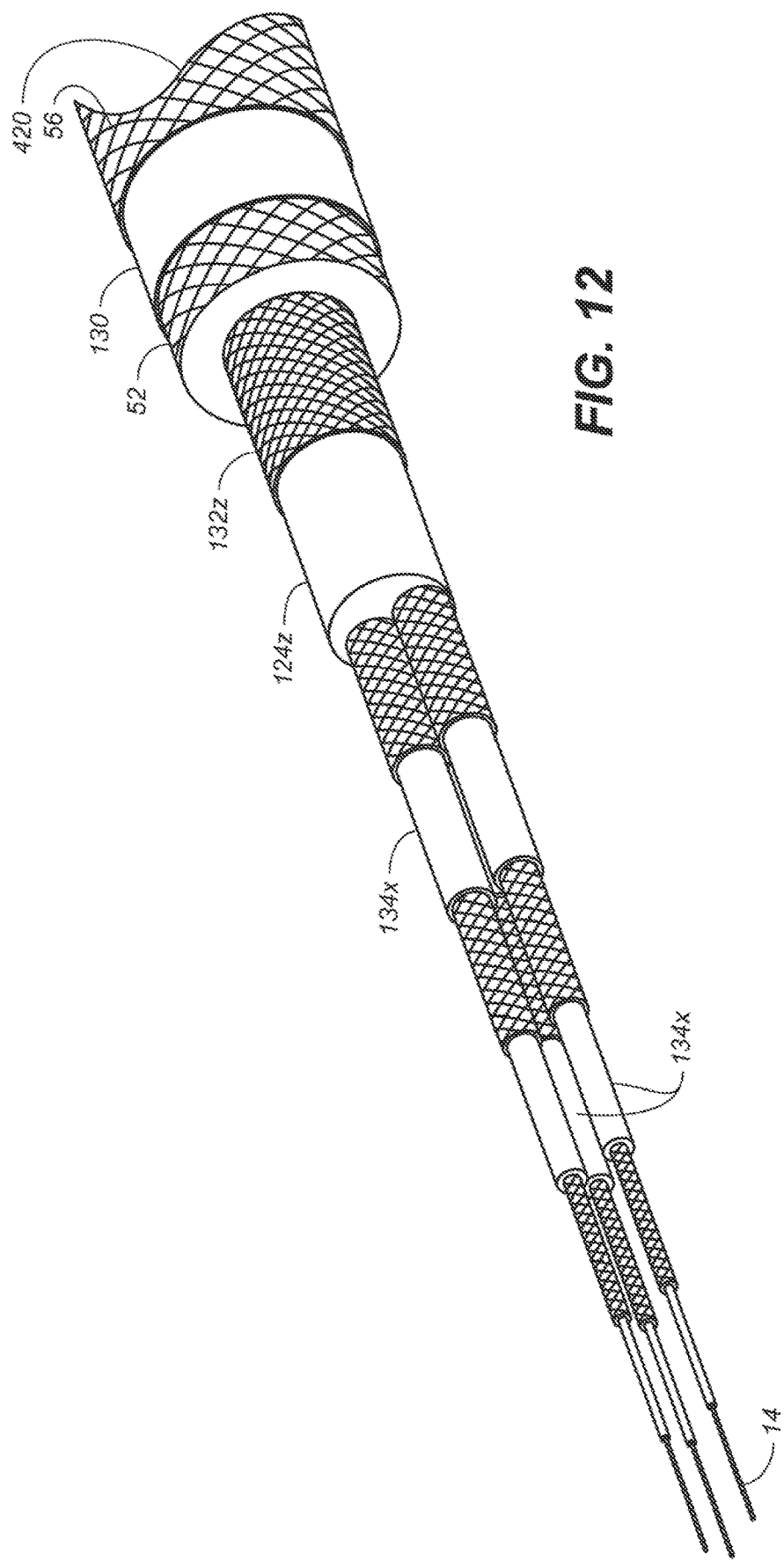
FIG. 12 is a perspective view of yet another alternative embodiment of the headline sonar cable having yet another alternative elongatable centrally located conductive structure that differs from the alternative elongatable centrally located conductive structures of FIG. 10 and FIG. 11.

In reference to FIG. 12: An alternative headline sonar cable 420 is formed by, in substitution of the bars described above, several distinct alternative elongatable internally-located conductive structures 134x are arranged into an alternative bundle 128, with or without a centrally located elongatable internally-located conductive structure 134x interior the bundle (no such centrally located elongatable internally-located conductive structure 134x being shown in the example of a headline sonar cable 420 as shown in FIG. 12). Next, another layer 124z of thermoplastic material is formed about the bundle. Next, another flow shield 132z of tightly braided fibers that preferably are polyester fibers is formed about the another layer 124z of thermoplastic material. The remainder of the headline sonar cable's structures are then formed around the flow shield 132z that encloses the bundle and the headline sonar cable is further processed as described previously for Steps (3) through (11) above. This preferred embodiment of headline sonar cable 320 is useful for transmission both of power as well as of data.

INDUSTRIAL APPLICABILITY

A headline sonar cable of the present disclosure also is capable of being used as a trawler warp, a towing warp, a deep sea winch line, a crane rope, a seismic line, a deep sea mooring line, a well bore line, and ROV tether or ROV line, a superwide for seismic surveillance, or as a load bearing data and/or energy cable. When the headline sonar cable 20 is fabricated for certain applications, such as headline cables used for towed seismic surveillance arrays, the headline sonar cable 20 may include several individual elongatable internally-located conductive structures 134; and/or may include several individual optical or other information carrying fibers and/or filaments rather than a single optical or other fiber and/or filament as depicted in the illustration of FIGS. 1A and 2A. For the purposes of this disclosure, as many distinct conductive optical and/or other fibers and/or filaments as required to carry both data signals and electrical energy for any particular application are understood to be included in the headline sonar cable 20, whether there be one or hundreds or even more distinct information carrying fibers and/or filaments. As is readily apparent to those skilled in the art, for a headline sonar cable 20 having two (2) or more distinct information carrying electrically conductive fibers and/or filaments each of those fibers and/or filaments must be electrically insulated from all of the other distinct information carrying fibers and/or filaments.

Moreover, it is a most preferred embodiment that a headline sonar cable 120 of the type depicted in FIGS. 9 and 9A having the single braided conductor 122 or the headline sonar cable 20 of the type depicted in FIGS. 1A and 2A having the combination of the single braided conductor 122 and the single fiber optic conductor 22 may include several individual conductors 122 in place of the single conductor 122, and my include several individual fiber optic conductors 22, that may be formed of traditional coaxial cables, where each individual electrical energy conductor 122 is formed of multiple information and/or energy carrying fibers and/or filaments, for example multiple copper filaments. For the purposes of this disclosure, as many distinct conductive fibers and/or filaments as required to carry both data signals and/or electrical energy for any particular application are understood to be included in each of the multiple conductors 122 that are situated in the headline sonar cable in substitution of the single conductor 122, whether there be one or hundreds or even more distinct information carrying fibers and/or filaments forming each individual conductor 122. Each conductor 122, formed of multiple information and/or energy carrying fibers and/or filaments, is preferably formed with a braided construction. The term "braided construction" is understood to include "plaited construction". The presently preferred construction for each of such multiple distinct and individual conductors 122 is a "hollow braid" or "hollow braided" construction, the terms "hollow braid" and "hollow braided" referring to the same structure.

In addition to being used with trawls, headline sonar cables in accordance with the present disclosure may be used as synthetic towing warps on trawlers or other vessels, are also used as a lead-in cable for towed seismic surveillance arrays, or a towing warp, a deep sea winch line, a crane rope, a seismic line, a deep sea mooring line, a well bore line, and ROV tether or ROV line, a superwide for seismic surveillance, or as a load bearing data and/or energy cable. Towing seismic surveillance arrays requires that the lead-in cable transmit both electrical energy and data signals a long distance between the towing vessel and the array with a minimum of drag, a minimum of weight, and a minimum of lead-in cable movement.

Furthermore, a significant use for headline sonar cables is stationary seismic surveillance such as anchored and/or moored cables for transmitting both data and electrical energy, and requiring a certain strength. Stationary seismic cables transfer data signals often up to a surface buoy, and are positioned on and/or relative to the seabed for long periods of time, even several years. Ocean currents tend to move such anchored seismic cables. Because it is important to limit movement of an anchored seismic cable as much as practicable, it is advantageous to reduce as much as possible the effect of ocean currents on an anchored seismic cable's location. A thinner anchored seismic cable tends to be moved less by ocean currents. Although the present invention has been described in terms of the presently preferred embodiment, it is to be understood that such disclosure is purely illustrative and is not to be interpreted as limiting. Consequently, without departing from the spirit and scope of the disclosure, various alterations, modifications, and/or alternative applications of the disclosure will, no doubt, be suggested to those skilled in the art after having read the preceding disclosure. Accordingly, it is intended that the following examples be interpreted as encompassing all alterations, modifications, or alternative applications as fall within the true spirit and scope of the disclosure.

The invention claimed is:

1. A method for producing a headline sonar cable (20, 120, 220, 320, 420), comprising the steps of:
   a) providing a first strength member (14);
   b) providing a conductor that is capable of data signal and/or electrical energy transmission and is capable of elongation;
   c) forming an elongatable internally located conductive structure by:
      (I) coupling said conductor to said first strength member (14) while ensuring that the conductor remains able to elongate;
      (ii) coupling the combination of the conductor and the first strength member (14) to thermoplastic material that is capable of reaching a molten phase and deforming during subsequent heating;
   d) braiding a strength-members jacket layer (52) of polymeric material so as to enclose the elongatable internally-located conductive structure while ensuring that the conductor remains elongatable during the steps of surrounding the elongatable internally-located conductive structure with the strength-member jacket layer (52) so that the conductor retains its ability to elongate during further desired processing steps and does not break upon stretching under heat and tension of the strength-member jacket layer (52) surrounding the elongatable internally-located conductive structure, wherein the first strength member (14) and strength-member layer (52) are selected and formed so that said first strength member (14) has less breaking strength than the strength member jacket layer (52); and
   e) stretching under heat the strength-member jacket layer (52) and the elongatable internally-located conductive structure followed by cooling both the elongatable internally-located conductive structure as well as the strength member jacket layer (52), while maintaining a tension needed to retain the elongated headline sonar cable at a determined amount of elongation from initial length, thereby permanently lengthening the headline sonar cable a predetermined amount while simultaneously not breaking or causing to become brittle the conductor.

2. The method of claim 1 further comprising an additional step of selecting to form the first strength member (14) with a different mass of material in comparison with a mass of material selected for forming the braided strength member jacket layer (52).

3. The method of claim 2 further comprising an additional step of selecting for the material mass of the first strength member (14) a material mass that is lesser than the material mass of the braided strength member jacket layer (52).

4. The method of claim 3 where the step of coupling the combination of the conductor and the first strength member (14) to the layer of thermoplastic material further comprises enclosing the combination of the conductor that is coupled to the first strength member (14) within the layer of thermoplastic material.

5. The method of claim 4 further comprising extruding and/or pultruding the layer of thermoplastic material about the combination of the conductor coupled to the first strength member (14) prior to forming the strength-member jacket layer (52).

6. The method of claim 3 further comprising selecting to form the conductor at the moment it is being coupled to the first strength member (14).

7. The method of claim 6 further comprising an additional step of selecting to form the conductor by braiding the conductor about the first strength member (14).

8. The method of claim 7 further comprising an additional step of selecting a braid angle when forming the braided conductor that is more obtuse in comparison to a braid angle selected for the initial formation with a braiding machine of the strength-member jacket layer (52).

9. The method of claim 3 further comprising additional steps of forming a shielding layer (36) of electrically conductive material around the layer of thermoplastic material prior to forming the strength-member jacket layer (52).

10. The method of claim 9, further comprising selecting to form another layer of thermoplastic material about the shielding layer (36) of electrically conductive material, prior to forming the strength-member jacket layer (52).

11. The method of claim 10 further comprising forming about the another layer of thermoplastic material a sheath of tightly braided fibers and/or filaments having a higher softening point than the softening point of the another layer of thermoplastic material, prior to forming the strength-member jacket layer (52).

12. The method of claim 11 further comprising additional steps of selecting to situate between the another layer of thermoplastic material and the sheath of tightly braided fibers and/or filaments from a minimum of at least one fiber optic conductor (22) to several fiber optic conductors prior to forming the strength-member jacket layer (52) by wrapping from at least one to several fiber optic conductors in spiral form about the another layer of thermoplastic material in such a fashion so as to ensure sufficient slack in the at least one fiber optic conductor (22) so that it does not break during the stretching of the strength member jacket layer (52).

13. The method of claim 12 further comprising steps of selecting to situate additional thermoplastic material so as to fill in at least some of void spaces (97, 98) existing between the another layer of thermoplastic material; the sheath of tightly braided fibers and/or filaments; and the at least one fiber optic conductor (22).

14. The method of claim 12 further comprising selecting to employ the shielding layer as the output loop of a first conductive loop while employing the conductor as the input loop of the first conductive loop, while employing at least one fiber optic conductor as another input.

15. The method of claim 9 further comprising selecting to employ the shielding layer (36) formed at electrically conductive material as another conductor, including so as to form a conductive loop employing the shielding layer (36) and the conductor.

16. The method of claim 9 further comprising additional steps of selecting to situate from at least one to several fiber optic conductors between at least the strength-member jacket layer (52) and the shielding layer (36).

17. The method of claim 3 wherein, at least prior to the step of permanently elongating the strength member jacket layer (52) the method further comprises an additional step of selecting to form the at least a first strength member (14) with a potential for constructional elongation at 10 C. that is different in comparison to a potential for constructional elongation at 10 C. of the conductor.

18. The method of claim 3 further comprising an additional step of selecting to form the first strength member (14) so that it requires more tension to elongate it beyond percent stretch in comparison to a tension required to elongate the conductor the same certain amount.

19. The method of claim 3 further comprising an additional step of selecting for the first strength member (14) a strength member having a breaking strength that is between two hundred fifty grams to sixteen hundred kilograms while selecting a breaking strength for the strength member jacket layer (52) that is at least four thousand kilograms up to four million kilograms.

20. The method of claim 3 further comprising an additional step of selecting to form the first strength member (14) with a different diameter and/or width in comparison with a diameter and/or width selected for forming the braided strength member jacket layer (52).

21. The method of claim 20 further comprising an additional step of selecting for the diameter and/or width of the first strength member (14) a diameter and/or width that is lesser than the diameter and/or width of the braided strength member jacket layer (52).

22. The method of claim 21 wherein, at least prior to the step of permanently elongating the strength member jacket layer (52), the method further comprises an additional step of selecting to form the strength member jacket layer (52) with an ability to elongate at temperatures lesser than 50 C. that is different in comparison to an ability to elongate of the first strength member (14) at temperatures lesser than 50 C.

23. The method of claim 21 further comprising an additional step of selecting for the first strength member (14) a strength member having a breaking strength that is between seventy thousand to twenty times lesser than the breaking strength of the strength member jacket layer (52).

24. The method of claim 21 further comprising an additional step of selecting to stretch the strength member jacket layer (52) to an extent that causes the first strength member (14) to experience failure.

25. The method of claim 21 further comprising an additional step of selecting to stretch the strength member jacket layer (52) to an extent that causes the first strength member (14) to break.

* * * * *